(12) United States Patent
Kuwabara et al.

(10) Patent No.: US 7,517,507 B2
(45) Date of Patent: Apr. 14, 2009

(54) STEAM REFORMER

(75) Inventors: Takeshi Kuwabara, Hadano (JP); Yoshio Tomizawa, Hadano (JP); Jun Ono, Hadano (JP); Yasushi Yoshino, Hadano (JP)

(73) Assignee: T.RAD Co., Ltd., Tokyo (JP)

( * ) Notice: Subject to any disclaimer, the term of this patent is extended or adjusted under 35 U.S.C. 154(b) by 632 days.

(21) Appl. No.: 10/547,805

(22) PCT Filed: Mar. 11, 2004

(86) PCT No.: PCT/JP2004/003242

§ 371 (c)(1),
(2), (4) Date: Sep. 1, 2005

(87) PCT Pub. No.: WO2004/080891

PCT Pub. Date: Sep. 23, 2004

(65) Prior Publication Data

US 2006/0185243 A1    Aug. 24, 2006

(30) Foreign Application Priority Data

Mar. 13, 2003 (JP) .............................. 2003-068286
Mar. 27, 2003 (JP) .............................. 2003-089208
Mar. 27, 2003 (JP) .............................. 2003-089211

(51) Int. Cl.
*B01J 8/00* (2006.01)

(52) U.S. Cl. .................. 422/190; 422/200; 422/201; 422/202; 422/203; 422/211; 422/236; 422/191; 422/194; 422/195; 422/197; 48/127.9; 48/198.3; 48/198.6; 423/650; 423/651; 423/652; 423/653

(58) Field of Classification Search ............... None
See application file for complete search history.

(56) References Cited

U.S. PATENT DOCUMENTS

| 5,030,440 | A |   | 7/1991 | Lywood et al. ............... 423/655 |
|---|---|---|---|---|
| 6,254,307 | B1 |   | 7/2001 | Ragold ............................ 404/4 |
| 6,506,359 | B1 |   | 1/2003 | Maruko ..................... 423/648.1 |
| 6,793,698 | B1 | * | 9/2004 | Sanger et al. ............... 48/127.9 |
| 7,367,996 | B2 | * | 5/2008 | Clawson et al. ................ 48/61 |
| 2004/0047800 | A1 | * | 3/2004 | Sennoun et al. ............. 423/652 |

FOREIGN PATENT DOCUMENTS

| JP | 2-69301 | 3/1990 |
|---|---|---|
| JP | 11-83367 | 3/1999 |
| JP | 11-199201 | 7/1999 |
| JP | 2001-192201 | 7/2001 |

* cited by examiner

*Primary Examiner*—Alexa D. Neckel
*Assistant Examiner*—Kaity V. Handal
(74) *Attorney, Agent, or Firm*—Jordan and Hamburg LLP

(57) ABSTRACT

The steam reformer has a double-cylinder structure having an inner cylinder and an outer cylinder surrounding the inner cylinder. The inner cylinder contains a high-temperature reaction section and an adjacent section being adjacent to the high-temperature reaction section. The high-temperature reaction section contains a mixed-catalyst bed prepared by mixing a steam reforming catalyst and an oxidation catalyst, and an oxygen-containing gas introduction section. A heat transfer suppresser is structured to suppress heat transfer from the high-temperature reaction section to the adjacent section or to the oxygen-containing gas introduction section. With the heat-transfer suppressor, the thermal diffusion from the high-temperature reaction section to peripheral area is effectively suppressed.

7 Claims, 8 Drawing Sheets

STEAM REFORMER

BACKGROUND OF THE INVENTION

The present invention relates to a steam reformer which generates hydrogen-rich reformed gas by conducting self-oxidation and reforming of a raw material gas-gas in the presence of steam and oxygen.

There is known a steam reformer which generates hydrogen-rich reformed gas by conducting steam reforming of a mixture of raw material gas-gas and steam, (hereinafter referred to as the "raw material gas-steam mixture"), in the presence of a steam reforming catalyst. The hydrogen-rich reformed gas produced in the steam reformer is favorably used as the fuel of fuel cells. The applicable raw material gas-gas includes hydrocarbons such as methane, aliphatic alcohols such as methanol, and ethers such as dimethylether.

The reaction formula of steam reforming in a steam reformer when methane is used as the raw material gas-gas is written as $CH_4 + 2H_2O \rightarrow CO_2 + 4H_2$, where a preferable range of reforming reaction temperature is from 700° C. to 750° C.

Internal heating is a system for supplying heat necessary for the reaction in the steam reformer. The internal heating steam reformer has a partial oxidation reaction bed at the supply side of the raw material gas-steam mixture, (or the upstream side of the reformer). The heat generated in the partial oxidation reaction bed is used to heat the steam reforming bed located at downstream side of the reformer up to the steam reforming reaction temperature. The steam reforming is carried out in thus heated steam reforming catalyst bed to generate the hydrogen-rich reformed gas. The partial oxidation reaction is written as $CH_4 + \frac{1}{2}O_2 \rightarrow CO + 2H_2$, where a preferable temperature for the partial oxidation reaction is 250° C. or above.

An improved model of the internal heating steam reformer is a self-oxidation internal heating steam reformer, and an example thereof is disclosed by Japanese Patent Application Laid-Open No. 2001-192201. The technology according to the patent publication generates heat in the oxidation reaction and the steam reforming reaction in a mixed catalyst bed prepared by mixing an oxidation catalyst and a steam reforming catalyst, respectively, at the same time.

FIG. 13 is a schematic cross sectional drawing of an example of steam reformer of self-oxidation internal heating type developed by the inventors of the present invention. The steam reformer 1 has an inner cylinder 2 and an outer cylinder 3 surrounding the inner cylinder 2. The inner cylinder 2 contains a high-temperature reaction section 6 at the uppermost portion of inside thereof. The high-temperature reaction section 6 contains a mixed catalyst bed 4 prepared by mixing a steam reforming catalyst and an oxidation catalyst, and has an oxygen-containing gas introduction section 5. Beneath the high-temperature reaction section 6, an adjacent section 7 constructed by a heat transfer bed is located. Beneath the adjacent section 7, a high-temperature shift catalyst bed 8 and a low-temperature shift catalyst bed 9 are located in this order.

The steam reforming catalyst is a catalyst for steam-reforming a raw material gas-gas. The applicable steam reforming catalyst includes a Ni-based reforming catalyst such as $NiO—SiO_2.Al_2O_3$, and a reforming catalyst such as $WO_2—SiO_2.Al_2O_3$ and $NiO—WO_2.SiO_2.Al_2O_3$.

The oxidation catalyst is a catalyst for oxidizing a raw material gas-gas in the raw material gas-steam mixture to generate heat, thereby attaining a temperature necessary for steam reforming. The applicable oxidation catalyst includes platinum (Pt) and palladium (Pd). The mixing ratio of the oxidation catalyst to the steam reforming catalyst is determined within a range from about 1 to 15% depending on the kind of the raw material gas-gas being subjected to steam-reforming. For example, about 5±2% of the mixing ratio is adopted for the case of methane as the raw material gas- and about 3±1% for the case of methanol as the raw material.

The shift catalyst for forming the high-temperature shift catalyst bed 7 and the low-temperature shift catalyst bed 9 includes a mixture containing $CuO—ZnO_2$, $Fe_2O_3$, $Fe_3O_4$, copper oxide, and the like. If, however, the reaction is carried out at 700° C. or higher temperature, $Cr_2O_3$ may be adopted.

The heat transfer bed structuring the adjacent section 7 absorbs heat from the reformed gas leaving the high-temperature reaction section 6 to cool the reformed gas. The heat transfer bed is structured by packing particles such as ceramics particles having good thermal conductivity.

The heat transfer bed may be eliminated in some cases. In that case, for example, the high-temperature shift catalyst bed 8 or both the high-temperature shift catalyst bed 8 and the low-temperature shift catalyst bed 9 structure the adjacent section 7 of the present invention.

Bottoms of the mixed catalyst bed 4, the adjacent section 7, the high-temperature shift catalyst bed 8, and the low-temperature shift catalyst bed 9 located in the inner cylinder 2 are supported by their respective air-permeable supports 10, 11, 12, and 13.

The oxygen-containing gas introduction section 5 has an introduction conduit 14 and ejection part 15 15 opened near the front end of the introduction conduit 14. The oxygen-containing gas may be air or oxygen gas. For example, compressed air supplied from an air compressor (not shown) is supplied to the introduction conduit 14, and the compressed air can be ejected into the mixed catalyst bed 4 through the ejection part 15 15.

A steam reforming catalyst bed 16 is positioned at the uppermost portion of inside the outer cylinder 3, and a heat transfer bed 17 is positioned beneath the steam reforming catalyst bed 16. Bottoms of the steam reforming catalyst bed 16 and the heat transfer bed 17 are supported by their respective air-permeable supports 18 and 19. A raw material gas-gas-steam mixture supply section 20 is positioned beneath the heat transfer bed 17. A discharge section 21 is opened above the steam reforming catalyst bed 16, the discharge section 21 being then connected to a supply section 22 located above the high-temperature reaction section 6. A discharge section 23 for discharging the yielded reformed gas is located beneath the low-temperature shift catalyst bed 9 positioned at the lowermost portion of the inner cylinder 2.

The internal temperature of the high-temperature reaction section 6 is required to be maintained in a high-temperature region so as the steam reforming reaction to be conducted efficiently. To do this, unnecessary thermal diffusion has to be minimized as far as possible. For attaining the minimization of thermal diffusion, a heat-insulation section 24 having a hollow part therein is located between a portion of the inner cylinder 2 where the high-temperature reaction section 6 is positioned and a portion of the outer cylinder 3 where the steam reforming catalyst bed 16 is positioned.

FIG. 14 shows a part-enlarged view containing the heat-insulation section 24. The heat-insulation section 24 has an annular inner wall part 25 and an annular outer wall part 26. By integrating the annular inner wall part 25 with the annular outer wall part 26 at top and bottom, respectively, by the respective side wall parts 27, an annular hollow part 28 is formed inside of them. The inner wall part 25 is a part of the inner cylinder 2.

Next, the method for steam reforming using the above steam reformer 1 is described. When the raw material gasgas-steam mixture is supplied to the supply section 20, the raw material gas-gas-steam mixture increases the temperature thereof while passing through the heat transfer bed 17, which is in a high temperature state, owing to the heat transfer from the high-temperature shift catalyst bed 8 and the low-temperature shift catalyst bed 9. The raw material gas-steam mixture at a high temperature then enters the steam reforming catalyst bed 16, where a part of the raw material gas-gas is subjected to steam reforming. The reformed gas and the residual raw material gas-gas-steam mixture are discharged from the discharge section 21 in the inner cylinder 2 to enter the high-temperature reaction section 6 via the supply section 22 in the inner cylinder 2.

In the high-temperature reaction section 6, a part of the raw material gas-gas in the influent raw material gas-gas-steam mixture is subjected to oxidation reaction by the oxygen in the oxygen-containing gas supplied from the oxygen-containing gas introduction section 5 in the presence of the oxidation catalyst which structures the mixed catalyst bed 4. The oxidation reaction increases the temperature of the raw material gas-steam mixture to a range necessary for reforming reaction, for example, from about 650° C. to about 750° C., (normally around 700° C.). That is, the self-oxidation and internal heating are carried out. With thus generated heat, the steam reforming reaction of the raw material gas-gas-steam mixture is conducted to yield a hydrogen-rich reformed gas at good efficiency. Specifically, the exothermic oxidation reaction and the endothermic reforming reaction proceed at the same time in the high-temperature reaction section 6, thus the uniform temperature distribution is maintained in the high-temperature reaction section 6. The steam reforming catalyst bed 16 in the outer cylinder 3 functions as a preliminary reforming section for the high-temperature reaction section 6.

The reformed gas yielded in the high-temperature reaction section 6 enters the adjacent section 7 beneath thereof, where the reformed gas decreases the temperature, and passes through the high-temperature shift catalyst bed 8 and then the low-temperature shift catalyst bed 9. During the passage through the high-temperature shift catalyst bed 8 and the low-temperature shift catalyst bed 9, most of carbon monoxide remaining in the reformed gas is converted to hydrogen. The high purity reformed gas leaving the low-temperature shift catalyst bed 9 is discharged from the discharge section 23, and is then supplied to an input device, (not shown), such as fuel cells for vehicles and fuel cells for household power source.

As described above, the heat-insulation section 24 suppresses the heat in the high-temperature reaction section 6 from diffusion to the outer cylinder 3. Nevertheless, as shown by arrow A in FIG. 14, the heat in the high-temperature reaction section 6 diffuses from the inner wall part 25 of the heat-insulation section 24 to the downstream side of the inner cylinder 2, or to the adjacent section 7, and further, a part of the heat also diffuses to the outer wall part 26 of the heat-insulation section 24 from the inner wall part 25 via the side wall part 27. As a result, the thermal energy consumed to heat the high-temperature reaction section 6 increases to lower the thermal efficiency and the reaction efficiency of the steam reformer 1.

Consequently, since only the heat transfer section 24 as shown in FIG. 14 cannot fully suppress the thermal diffusion from the high-temperature reaction section 6 to the adjacent section 7 or to the oxygen-containing gas introduction conduit 4, the effect to lower the thermal efficiency and the reaction efficiency in the steam reformer 1 is insufficient.

To this point, a problem of the present invention is to further solve the thermal diffusion disadvantage at the high-temperature reaction section.

That is, an object of the present invention is to improve the suppression of thermal diffusion from the high-temperature reaction section to the adjacent section.

Another object of the present invention is to improve the suppression of thermal diffusion from the high-temperature reaction section to the oxygen-containing gas introduction conduit.

A further object of the present invention is to improve the suppression of both the thermal diffusion from the high-temperature reaction section to the adjacent section and the thermal diffusion from the high-temperature reaction section to the oxygen-containing gas introduction conduit.

A still another object of the present invention is to improve the suppression of thermal diffusion from the high-temperature reaction section to the adjacent section and to the oxygen-containing gas introduction conduit with a simple structure of the steam reformer.

A still further object of the present invention is to improve the thermal efficiency and the reaction efficiency of the steam reformer.

BRIEF SUMMARY OF THE INVENTION

The steam reformer 1 according to the present invention has a double-cylinder structure having an inner cylinder 2 and an outer cylinder 3 surrounding the inner cylinder 2. The inner cylinder 2 contains a high-temperature reaction section 6 and an adjacent section 7 being adjacent to the high-temperature reaction section 6. The high-temperature reaction section 6 contains a mixed-catalyst bed 4 prepared by mixing a steam reforming catalyst and an oxidation catalyst, and has an oxygen-containing gas introduction section 5. The outer cylinder 3 contains a steam reforming catalyst bed 16. The steam reformer 1 according to the present invention has a heat-transfer suppresser 50 which suppresses heat transfer from the high-temperature reaction section 6 to the adjacent section 7 or to the oxygen-containing gas introduction section 5.

As described above, according to the present invention, the heat-transfer suppressor 50 in the steam reformer 1 effectively suppresses the thermal diffusion from the high-temperature reaction section 6 to the adjacent section 7 or to the oxygen-containing gas introduction section 5, thereby improving the thermal efficiency and the reaction efficiency in the high-temperature reaction section 6.

In the steam reformer 1, a heat-insulation section 24 having a hollow part therein is placed between a portion of the inner cylinder 2 containing the high-temperature reaction section 6 and a portion of the outer cylinder 3 facing the portion of inner cylinder 2 to form an opening part 30 being opened in an inner wall part 25 structuring the hollow part. With the configuration, the opening part 30 structures the heat-transfer suppressor 50 to suppress heat transfer from the high-temperature reaction section 6 to the adjacent section 7. The opening part 30 can be formed by a plurality of slits 31 being arranged in annular pattern on the inner wall part 25.

Thus structured heat-transfer suppressor 50 can efficiently suppress the thermal diffusion from the high-temperature reaction section 6 to the adjacent section 7 with the simple structure.

Furthermore, in the steam reformer 1, a vacant layer 40 is formed to isolate the high-temperature reaction section 6 from the adjacent section 7 at a specific distance, thus the vacant layer 40 structures the heat-transfer suppressor 50 to suppress heat transfer from the high-temperature reaction section 6 to the adjacent section 7.

The oxygen-containing gas introduction section 5 has an introduction conduit 14 extending along the axis of the inner cylinder 2, and an ejection part 15 located near the front end of the conduit 14. The introduction conduit 14 has a support piece 42 protruding outward therefrom, while the inner cylinder 2 has a support piece 41 protruding inward therefrom opposite to the outward protruding support piece 41, thus the bottom of the mixed catalyst bed 4 is supported by an air-permeable support 43 positioned on these support pieces 41 and 42, thereby forming the vacant layer 40 between the support 43 and the adjacent section 7.

Also the heat-transfer suppressor 50 structured by the vacant layer 40 can efficiently suppress the thermal diffusion from the high-temperature reaction section 6 to the adjacent section 7 with the simple structure.

Furthermore, in the steam reformer 1, a heat-insulation section 24 having a hollow part therein is placed between a portion of the inner cylinder 2 containing the high-temperature reaction section 6 and a portion of the outer cylinder 3 facing the portion of inner cylinder 2 to form an opening part 30 being opened in an inner wall part 25 structuring the hollow part, thus the opening part 30 structures the heat-transfer suppressor 50 to suppress heat transfer from the high-temperature reaction section 6 to the adjacent section 7. In addition, a vacant layer 40 is formed to isolate the high-temperature reaction section 6 from the adjacent section 7 at a specific distance, thus the vacant layer 40 structures the heat-transfer suppressor 50 to suppress heat transfer from the high-temperature reaction section 6 to the adjacent section 7.

By forming both the heat-transfer suppressor 50 using the hollow part 30 and the heat-transfer suppressor 50 using the vacant layer 40, the thermal diffusion from the high-temperature reaction section 6 to the adjacent section 7 can be suppressed more efficiently.

Furthermore, in the steam reformer 1, the oxygen-containing gas introduction section 5 has an introduction conduit 14 extending along the axis of the inner cylinder 2, and an ejection part 15 located near the front end of the conduit 14. The introduction conduit 14 has a cylinder body 40a forming a gap layer 41a outside the introduction conduit 14, or a heat-insulation layer 43a to cover outside of the introduction conduit 14, thus the cylinder body 40a or the heat-insulation layer 43a structures the heat-transfer suppressor 50 to suppress the heat transfer from the high temperature reaction section 6 to the oxygen-containing gas introduction section 4.

The heat-transfer suppressor 50 structured by the cylinder body 40a or the heat-insulation layer 43a can effectively suppress the heat transfer from the high-temperature reaction section 6 to the oxygen-containing gas introduction section 5 with the simple structure, thereby improving the thermal efficiency and the reaction efficiency of the high-temperature reaction section 6.

Furthermore, in the steam reformer 1, in addition to the heat-transfer suppressor 50 structured by the cylinder body 40a or the heat-insulation layer 43a, which suppress the heat transfer from the high-temperature reaction section 6 to the oxygen-containing gas introduction section 5, there can be structured:

(1) a heat-insulation section 24 having a hollow part therein being placed between a portion of the inner cylinder 2 containing the high-temperature reaction section 6 and a portion of the outer cylinder 3 facing the portion of inner cylinder 2 to form an opening part 30 being opened in an inner wall part 25 structuring the hollow part, thereby structuring the heat-transfer suppressor 50 by the opening part 30 to suppress heat transfer from the high-temperature reaction section 6 to the adjacent section 7;

(2) a vacant layer 40 being formed to isolate the high-temperature reaction section 6 from the adjacent section 7 at a specific distance, thereby structuring the heat-transfer suppressor 50 by the vacant layer 40 to suppress heat transfer from the high-temperature reaction section 6 to the adjacent section 7; or (3) the heat-transfer suppressors 50 for both above (1) and (2).

Since thus formed heat-transfer suppressors 50 can efficiently suppress the thermal diffusion from the high-temperature reaction section 6 to the oxygen-containing gas introduction section 5 and to the adjacent section 7, the thermal efficiency and the reaction efficiency of the high-temperature reaction section 6 can further be improved.

Furthermore, in any of the above steam reformers 1, the inner cylinder 2 contains, in addition to the mixed catalyst bed 4, a high-temperature shift catalyst bed 8 and a low-temperature shift catalyst bed 9; the outer cylinder 3 contains a steam reforming catalyst bed 16; each of the high-temperature shift catalyst bed 8, the low-temperature shift catalyst bed 9, and the steam reforming catalyst bed 16 is packed with a catalyst 44a in particle shape; and inner wall face of at least one of the mixed catalyst bed 4, the high-temperature shift catalyst bed 8, the low-temperature shift catalyst bed 9, and the steam reforming catalyst bed 16, which beds contacting with the catalyst particles 44a, is formed to a dimple face 45 where many concavities are successively arranged uniformly in two-dimensional morphology, thereby establishing the face-contact between the catalyst particles 44a and the concavities.

With the above structure, the packing efficiency of the catalyst particles 44a is improved, thereby improving the heat transfer efficiency inside the catalyst bed. As a result, the reaction efficiency of the steam reformer 1 can be improved.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
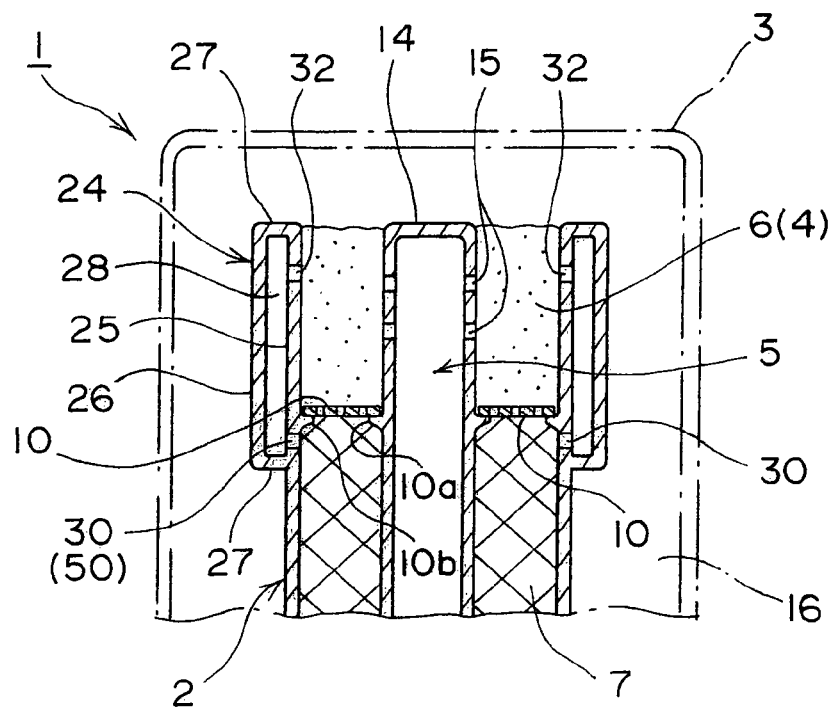
FIG. 1 shows a part-enlarged cross sectional view of the heat-insulation section and peripheral area of the steam reformer of the present invention.

The embodiments of the present invention are described below referring to the drawings. In FIG. 1, the main parts and the catalysts of the steam reformer of the embodiments are the same to those given in FIG. 13 so that the same reference number is given to the same part, and further description therefor is omitted to avoid redundancy.

The steam reformer 1 has the double cylinder structure having the inner cylinder 2 and the outer cylinder 3 located outside the inner cylinder 2. The inner cylinder 2 contains the high-temperature reaction section 6. The high-temperature reaction section 6 contains the mixed catalyst bed 4 of the mixture prepared by mixing the steam reforming catalyst and the oxidation catalyst, and has the oxygen-containing gas introduction section 5. The bottom of the mixed catalyst bed 4 in the high-temperature reaction bed 6 is supported by the circular and air-permeable support 10 fabricated by punching metal or the like. The adjacent section 7 structured by the heat transfer bed is located at downstream side of the support 10, (lower part of FIG. 1). The support 10 is seated on a support piece 10a formed on the introduction conduit 14 and on a support piece 10b formed on the inner wall part 25. The steam reforming catalyst bed 16 is located in the outer cylinder 3.

Figure 13:
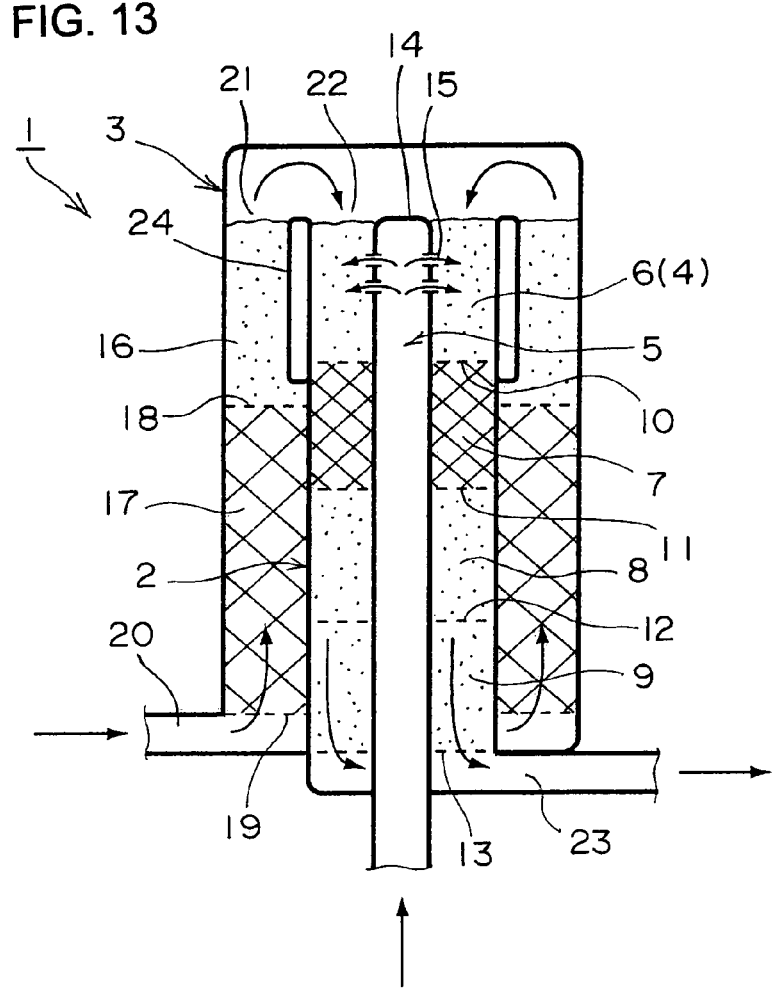
FIG. 13 is a schematic cross sectional drawing of an example of self-oxidation steam reformer of the present invention.
Figure 14:
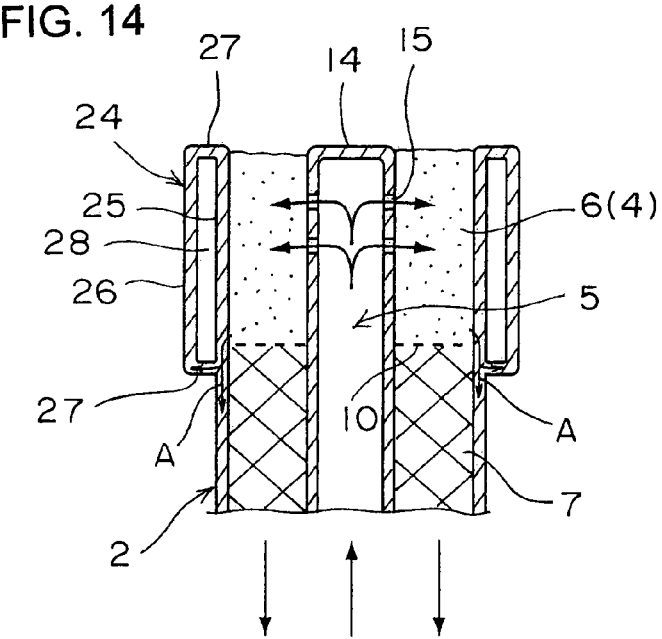
FIG. 14 shows a part-enlarged view of the heat-insulation section 24 and peripheral area in FIG. 13.

To suppress the thermal diffusion from the high-temperature reaction section 6 to the outer cylinder 3, the heat-insulation section 24 similar to that in FIG. 13 is positioned outside the high-temperature reaction section 6. The heat-insulation section 24 is formed in hollow shape surrounded by the annular inner wall part 25, the annular outer wall part 26, and the side wall parts 27 connecting with the respective top and the bottom thereof. With the configuration, thus formed inner space structures the annular hollow part 28. The inner wall part 25 is a part of the inner cylinder 2.

The opening part 30 structuring the heat-transfer suppressor 50 is formed between the inner wall part 25 and the adjacent section 7. The opening part 30 suppresses the heat of the high-temperature reaction section 6 to diffuse from a portion of the inner wall 2 to the adjacent section 7. Furthermore, the opening part 30 effectively suppresses a part of the heat from diffuse to the outer wall part 26 via the side wall part 27. Owing to these heat transfer suppressing effects, the thermal energy consumed in the high-temperature reaction section 6 is decreased, and the thermal efficiency and the reaction efficiency in the reforming reaction are improved.

Figure 2:
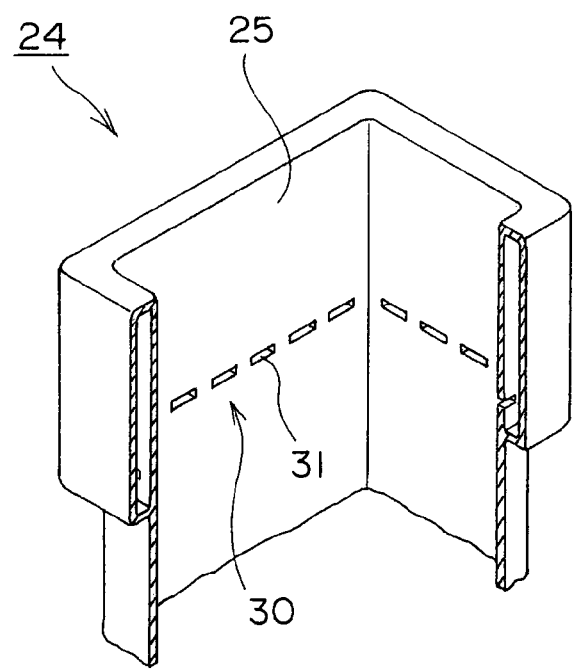
FIG. 2 shows a part-enlarged perspective view of an example of the opening part 30 in FIG. 1.
Figure 3:
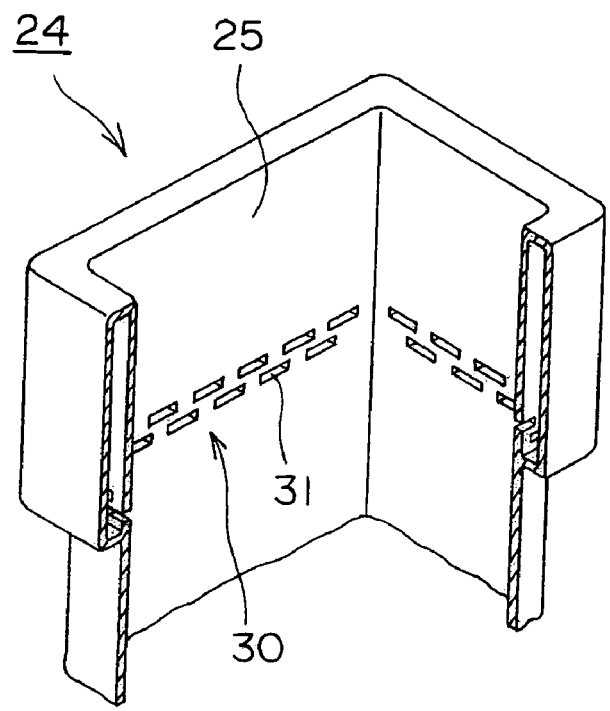
FIG. 3 shows a part-enlarged perspective view of another example of the opening part 30 of FIG. 1.

FIGS. 2 and 3 show examples of the opening part 30. The opening part 30 is structured by a plurality of relatively short slits 31 arranged discontinuously in annular pattern along the periphery of the inner wall part 25. FIG. 2 shows an example of single raw of the slits 31, while FIG. 3 shows an example of two rows of staggered arrangement of the slits 31. The interval between the slits 31 is preferably as small as possible to suppress the thermal diffusion, though the lower limit of the interval thereof is limited by the strength point of view.

The embodiment shown in FIG. 1 has an additional opening part 32 to upper portion of the inner wall pat 25, other than the opening part 30. The opening part 32 may be similar to the slits 31 shown in FIGS. 2 and 3. The opening part 32 can suppress the thermal diffusion from the inner wall part 25 to the outer wall part 26 via the upper side wall part 27. The opening part 32, however, can be eliminated in some cases.

Figure 4:
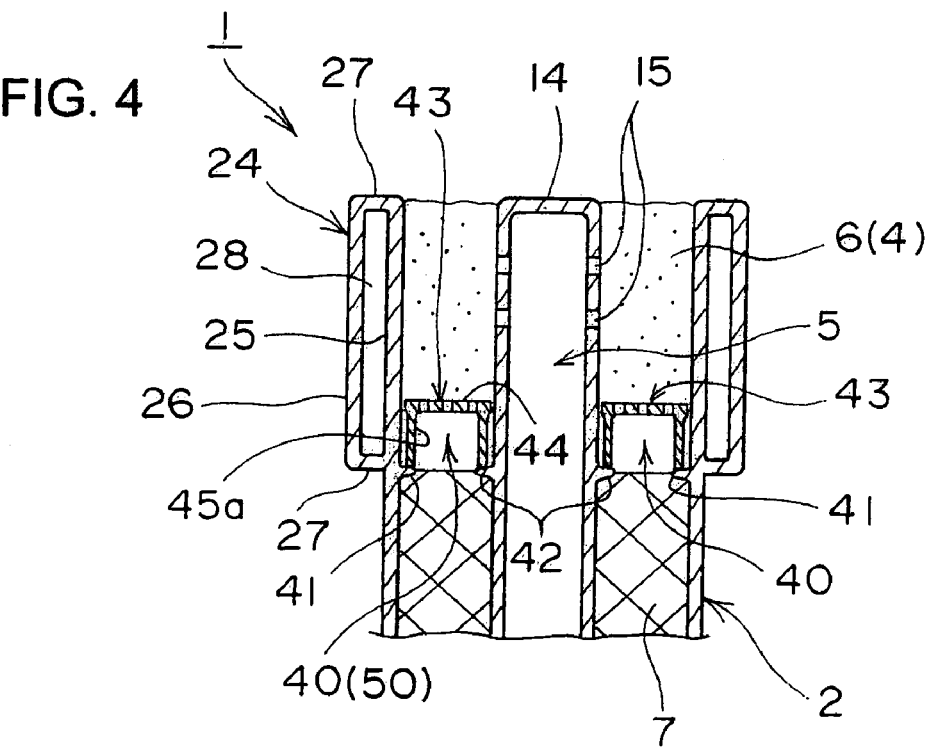
FIG. 4 shows another embodiment of the steam reformer of the present invention showing a part-enlarged cross sectional view of the heat-insulation section and peripheral area.

The steam reformer 1 shown in FIG. 4 is characterized in forming a vacant layer 40 to isolate the bottom of the high-temperature reaction section 6 from the adjacent section 7 in the inner cylinder 2 at a specific distance. The vacant layer 40 structures the heat-transfer suppressor 50 which suppresses thermal diffusion of heat from the high-temperature reaction section 6 to the adjacent section 7 by heat conduction. The heat-transfer suppressor 50 can save the thermal energy of the high-temperature reaction section 6 and improve the thermal efficiency and the reaction efficiency in the reforming reaction.

At lower portion of the inner wall part 25 in the heat-insulation section 24, the support piece 41 protruding inward therefrom is placed, while the support piece 42 protrudes outward from a portion of the introduction conduit 14 structuring the oxygen-containing gas introduction section 5, facing the portion of support piece 41. These support pieces 41 and 42 may be formed in an annular continuous structure along the periphery thereof, or may be formed in discontinuous shape along the periphery thereof. The air-permeable support 43 is placed on each of the support pieces 41 and 42.

The support 43 is totally formed in an annular shape, and is structured by the porous circular support plate 44 fabricated by punching metal or the like, and by a leg part 45a extending downward from the support plate 44. The bottom of the leg part 45a is supported by the support pieces 41 and 42. The vacant layer 40 is thus formed by a space among the support 43 and the support pieces 41 and 42. The vertical distance of the vacant layer 40 can be varied by adjusting the length of the leg part 45a. The vertical distance can also be adjusted, to some extent, by the adjustment of the height of heat transfer material packed in the adjacent section 7 at downstream side of the vacant layer 40.

Figure 5:
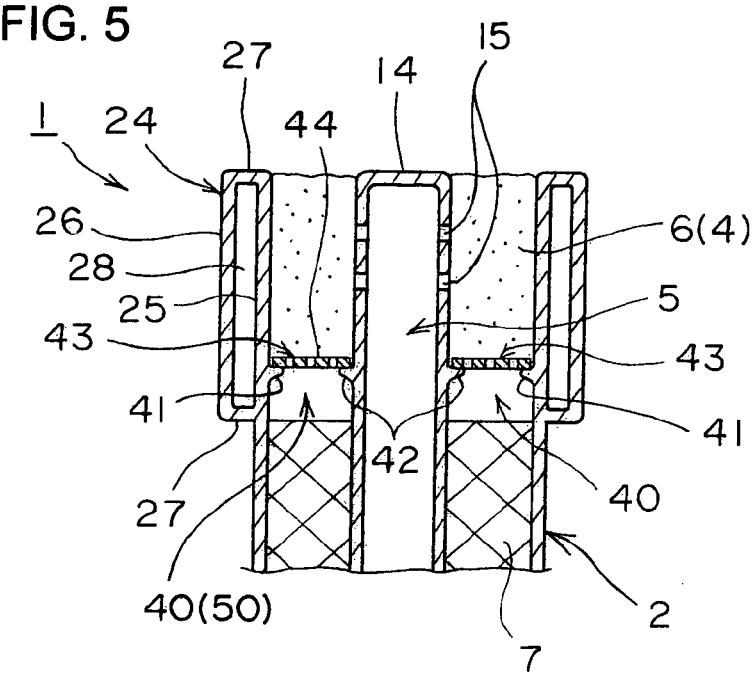
FIG. 5 shows a part-enlarged cross sectional view of a modified example of FIG. 4.

FIG. 5 is a modification of FIG. 4. According to the embodiment, the support 43 which structures the vacant layer 40 is made only by the porous circular support plate 44 fabricated by punching metal or the like, and does not have the leg part 45a which is seen in the example of FIG. 4. A difference from FIG. 4 is that both the position of the support piece 41 protruding inward from the lower portion of the inner wall part 25 at the heat insulation section 24 and the position of the support piece 42 protruding outward from the introduction conduit 14 facing the support piece 41 are positioned higher by the length of the leg part 45a in FIG. 4.

Figure 6:
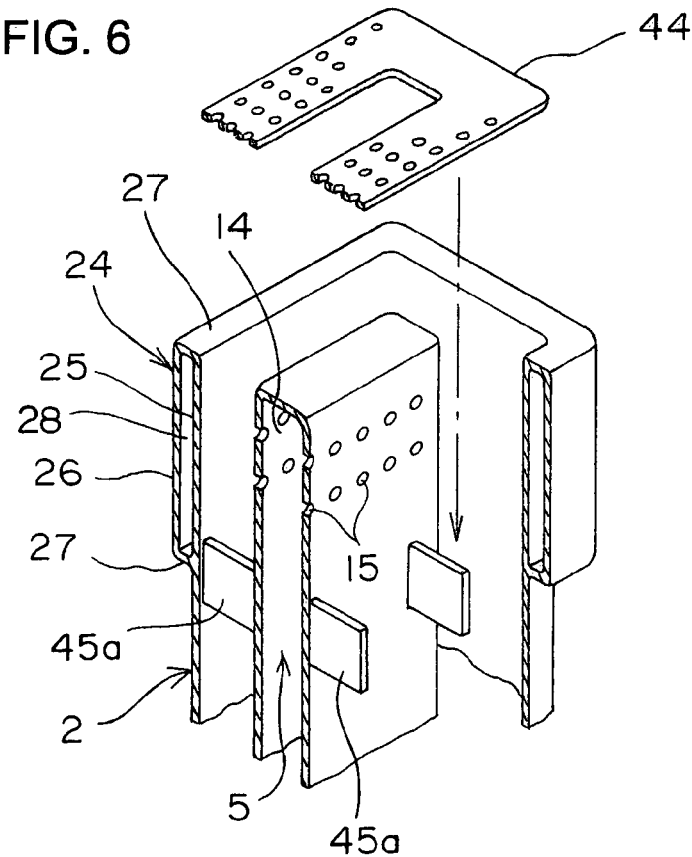
FIG. 6 shows a part-enlarged perspective view of another modified example of FIG. 4.

FIG. 6 is another modification of FIG. 4. According to the embodiment, the support 43 structuring the vacant layer 40 is structured by the porous circular support plate 44 fabricated by punching metal or the like and a plurality of leg parts 45a. The leg part 43a is, however, not integrally connected with the support plate 44, which is seen in FIG. 4, but separated from the support 4. The plurality of leg parts 45a formed in a thin rectangular strip shape is fixed to the outer face of the introduction conduit 14 in a position of vertical surface thereof. Then the support plate 44 is placed on these leg parts 45a. The vertical distance of the vacant layer 40 is determined by the vertical length of the leg parts 45a.

Figure 7:
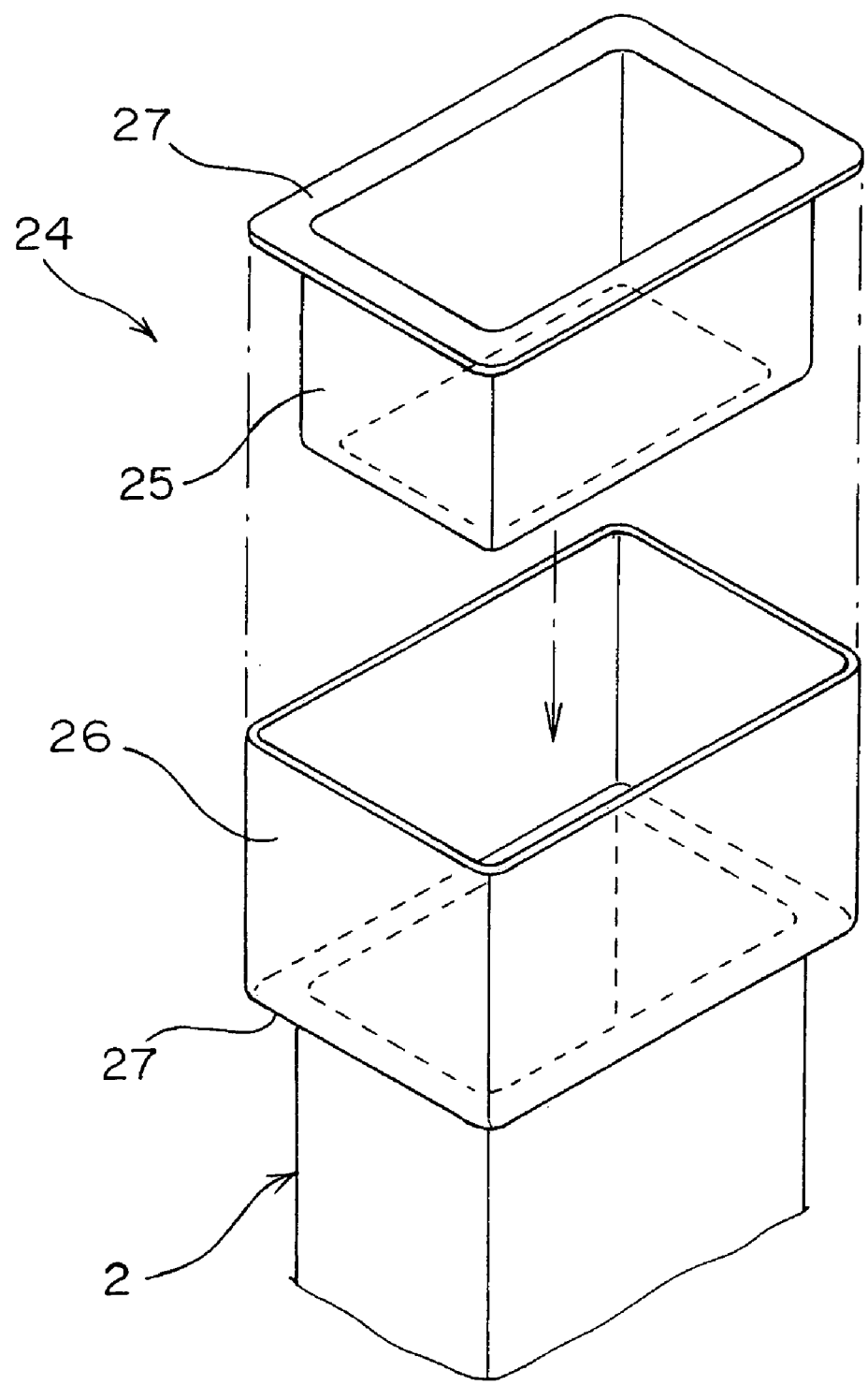
FIG. 7 is a further embodiment of the steam reformer of the present invention showing a part-enlarged perspective view of disassembled heat-insulation section and peripheral area.
Figure 8:
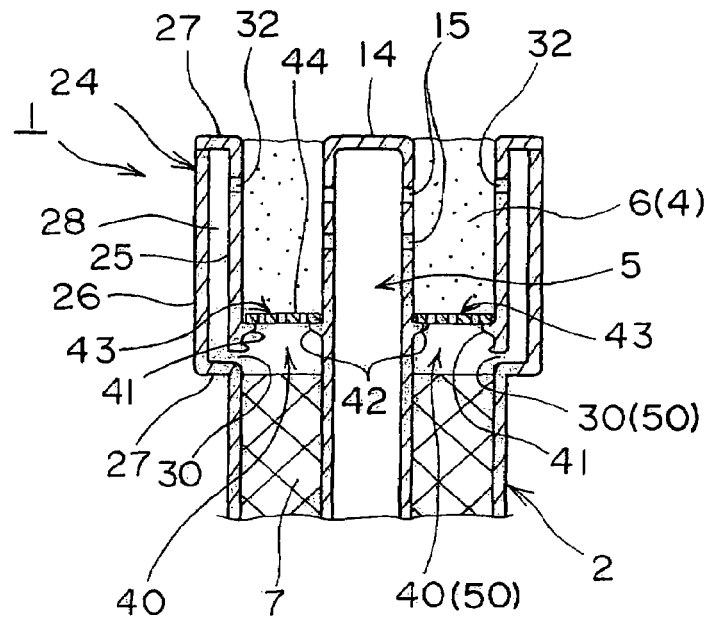
FIG. 8 shows a part-enlarged cross sectional view after assembly of FIG. 7.

FIG. 7 is a further embodiment of the steam reformer of the present invention, showing a disassembled part-enlarged perspective view of the heat-insulation section and peripheral area. FIG. 8 shows a cross sectional view of the assembled heat-insulation section and peripheral area of FIG. 7. The embodiment given in FIGS. 7 and 8 has two heat-transfer suppressors 50, or the vacant part 30 given in the example of FIG. 1 and the vacant layer 40 given in FIG. 4. These two heat-transfer suppressors 50 further effectively suppress the diffusion of heat from the high-temperature reaction section 6 to the adjacent section 7.

The embodiment widens the cross sectional area at upper portion of the inner cylinder 2. When the heat-insulation section 24 is inserted into the widened part in the arrow direction in FIG. 7 to assemble them together, the state shown in FIG. 8 is established. The vertical wall of the widened part of the inner cylinder 2 structures the outer wall part 26 of the heat-insulation section 24, while the horizontal wall of the widened part thereof structures the side wall part 27 at lower portion of the heat-insulation section 24. Furthermore, the opening part 30 is formed between the side wall part 27 and the lower end of the inner wall part 25. If needed, another opening part (slit) 32 may be placed at upper portion of the inner wall part 25.

Similar to the example of FIG. 6, the vacant layer 40 is formed by the support 43 which is structured only by the porous circular support plate 44 fabricated by punching metal or the like. Both the support piece 41 protruding inward from the lower portion of the inner wall part 25 of the heat-insulation section 24 and the support piece 42 protruding outward from the introduction conduit 14 facing the support piece 41 are positioned higher by the length of the leg part 45a in FIG. 4. Then the support 43 is placed on these support pieces 41 and 42.

Figure 9:
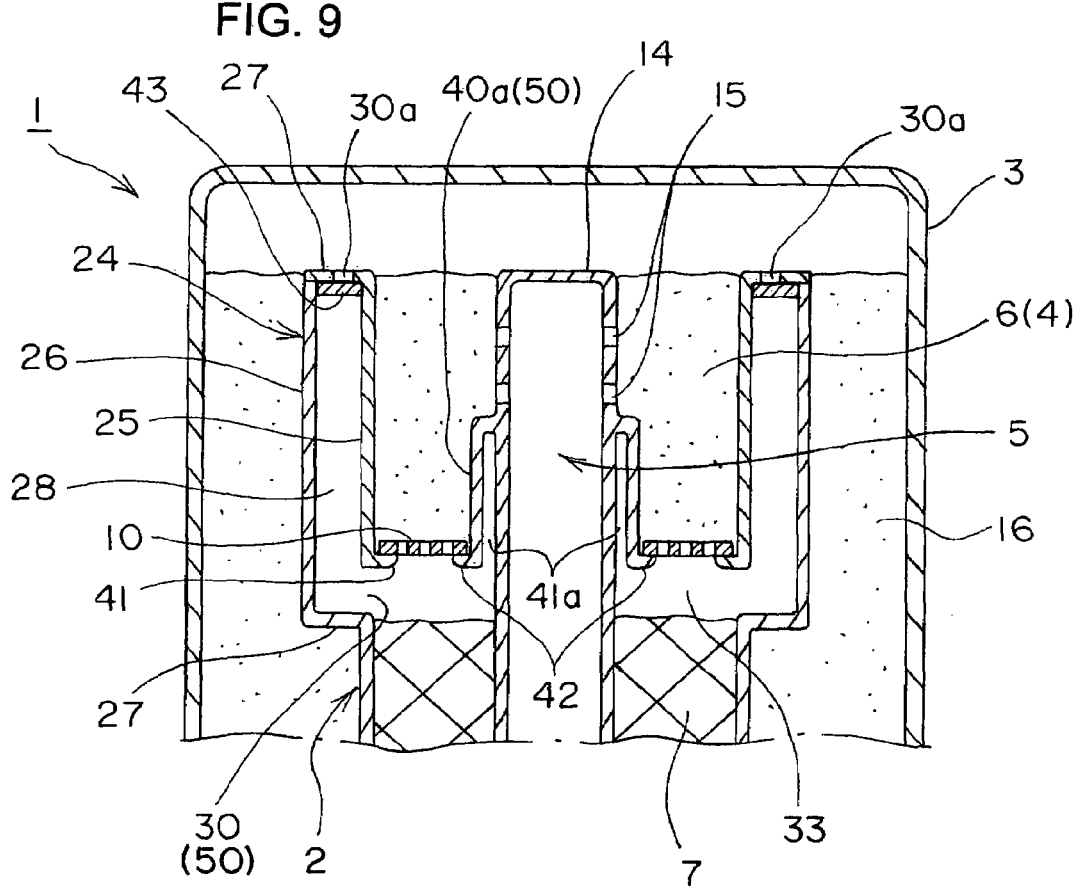
FIG. 9 shows still another embodiment of the steam reformer of the present invention showing a part-enlarged cross sectional view of the heat insulation section and peripheral area.

FIG. 9 is a still another embodiment of the steam reformer 1 of the present invention. The part-enlarged view of the high-temperature reaction section 2 and peripheral area is given similar to that of FIG. 1. The main part of the steam reformer 1 of the embodiment is the same to that of FIG. 1.

The steam reformer 1 has a double-cylinder structure having the inner cylinder 2 containing the high-temperature reaction section 6 and the adjacent section 7 being adjacent to the high-temperature reaction section 6, and the outer cylinder 3 surrounding the inner cylinder 2. The high-temperature reaction section 6 contains the mixed-catalyst bed 4 prepared by mixing the steam reforming catalyst and the oxidation catalyst, and has the oxygen-containing gas introduction section 5. The outer cylinder 3 contains the steam reforming catalyst bed 16. The heat-insulation section 24 having the annular hollow part therein is placed outside the inner cylinder 2.

The vertical wall in the widened part of the inner cylinder 2 structures the outer wall part 26 of the heat-insulation section 24, while the flange-shape portion in the widened part structures the side wall part 27 at lower portion of the heat-insulation section 24.

The oxygen-containing gas introduction section 5 has the introduction conduit 14 extending in the axial direction of the inner cylinder 2, and the ejection part 15 positioned near the front end thereof. The cylinder body 40a having an inner diameter larger than the outer diameter of the introduction conduit 14 is positioned to surround the periphery of the introduction conduit 14. The top of the cylinder section 40a connects with the upper portion of the introduction conduit 14, or directly beneath the ejection part 15. The gap layer 41a having a specified width is formed between the introduction conduit 14 and the cylinder body 40a. The gap layer 41a extends from the above-described connection point to the position of lower edge of the inner wall part, while opening the lower end thereof. With the cylinder body 40 structuring the gap layer 41a, the thermal diffusion suppressor 50 is formed to suppress the thermal diffusion from the high-temperature reaction section 6 to the oxygen-containing gas introduction conduit 14.

The outer peripheral face at lower portion of the mixed catalyst bed 4 supported by the support plate 10 contacts with the inner face of the cylinder body 40a, and does not contact with the introduction conduit 14. Consequently, the heat transfer from the high-temperature reaction section 6 (the mixed catalyst bed 4) to the introduction conduit 14 is significantly suppressed, which increases the thermal efficiency of the high-temperature reaction section 6.

According to the embodiment, two heat transfer and diffusion suppressors 50 are installed to suppress the heat transfer and diffusion from the high-temperature reaction section 6 to the adjacent section 7. The one of the heat transfer and diffusion suppressors 50 is structured by the opening part 30 formed in annular shape at lower portion of the inner wall part 25 which structures the heat-insulation section 24.

The other heat transfer and diffusion suppressor 50 is structured by the vacant layer. That is, the annular support piece 41 protruding inward from the lower end portion of the inner wall part 25, and the annular support piece 42 protruding outward from the lower end portion of the cylinder body 40a, facing the support piece 41, are prepared, on which support pieces 41 and 42 the circular air-permeable circular support 10 fabricated by punching metal or the like is supported. The bottom of the mixed catalyst bed 4 in the high-temperature reaction section 6 is supported by the support 10, while the adjacent section 7 structured by the heat transfer bed is located at downstream side thereof (lower part of FIG. 9). Thus, the vacant layer 40 structuring the heat-transfer suppressor 50 is formed between the bottom face of the mixed catalyst bed 4 and the top face of the adjacent section 7.

In this manner, the embodiment has three heat-transfer suppressors 50: namely the cylinder body 40a, the opening part 30, and the vacant layer 33. Owing to the synergy effect of these three heat-transfer suppressors 50, the thermal diffusion from the high-temperature reaction section 6 to the peripheral area is extremely effectively suppressed. In some cases, any of the opening part 30 and the vacant layer 40 may be eliminated.

The embodiment shown in FIG. 9 has the opening part 30a which is formed by arranging the short slits in the extended section in flange shape between the top edge of the inner wall part 25 and the top edge of the outer wall part 26, both of which wall parts structure the heat insulation section 24. The opening part 30a functions to suppress the heat transfer from the top edge of the inner wall part 25 to the outer wall part 26, and the opening part 30a may be eliminated in some cases.

Figure 10:
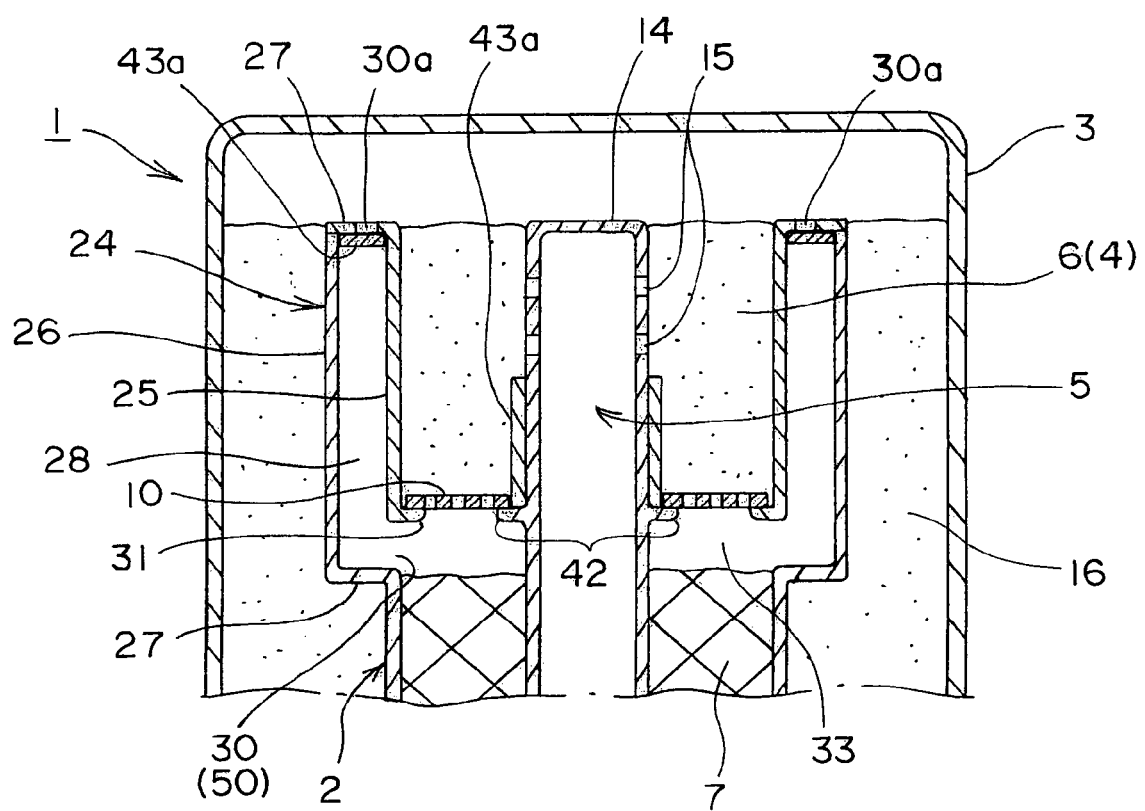
FIG. 10 shows a part-enlarged perspective view of the heat-insulation section and peripheral area of a modified heat-transfer suppressor 50 of FIG. 9.

FIG. 10 is a modification of FIG. 9. The difference of the embodiment from the example of FIG. 9 is only the heat-transfer suppressor 50, and other components have similar configurations to those in FIG. 9. The heat-transfer suppressor 50 is structured by the cylindrical heat-insulation layer 43a covering outside of the introduction conduit 14. The heat-insulation layer 43a is structured by forming an inorganic fibrous material such as glass fiber, having heat resistant and heat insulation properties, into a cylindrical shape, which is then inserted along the outer periphery of the introduction conduit 4.

The top of the heat insulation layer 43a extends to the upper portion of the introduction conduit 14, similar to the example of FIG. 9, or to directly beneath the ejection part 15, while the bottom thereof extends to the position of bottom edge portion of the inner wall part 25 structuring the heat insulation section 24. Similar to the example of FIG. 9, the annular air-permeable support plate 10 is supported on the annular support piece 41 positioned at bottom edge portion of the inner wall part 25, and on the annular support piece 42 located on the outer periphery of the introduction conduit 4, facing the support piece 41. Since, however, the inner peripheral face of the support plate 10 contacts with the outer peripheral face of the heat-insulation layer 43a, and since it does not contact directly with the introduction conduit 14, the transfer of heat from the mixed catalyst bed 4 to the introduction conduit 14 via the support plate 10 is effectively suppressed.

Figure 11:
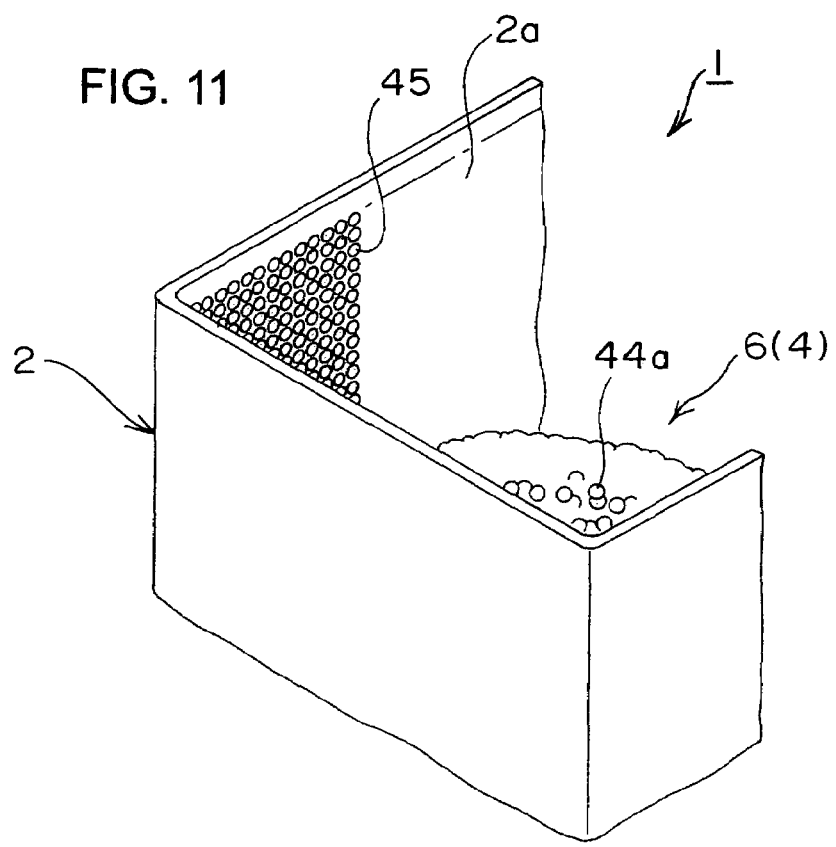
FIG. 11 shows a still further embodiment of the steam reformer of the present invention showing a part perspective view of the high-temperature reaction section and peripheral area.

FIG. 11 is a still further embodiment of the steam reformer of the present invention. The embodiment is characterized in that the wall face contacting with the catalyst bed in the steam reformer 1 is designed to a specific shape. The specific shape can be applied to the wall face of the inner cylinder 2 and the outer cylinder 3 of the above-described embodiments.

FIG. 11 shows an example of inner peripheral face of the high-temperature reaction section 6 of the inner cylinder 2, formed into a specific shape. The mixed catalyst bed 4 positioned in the high-temperature reaction section 6 is structured by the closest-packing of small particles of catalyst 44a (a mixture of particles of steam reforming catalyst and particles of oxidation catalyst). The inner face 2a, in the inner cylinder 4, contacting at least with the mixed catalyst bed 4 is a dimple face 45 which is fabricated by forming numerous concavities thereon at an equal spacing in two-dimensional pattern. A portion of the outer peripheral section of the particles of catalyst 44a structuring the mixed catalyst bed 4 contacts with that portion of the inner face 2a so as the catalyst particles to enter the dimples.

Individual concavities on the dimple face 45 have the same radius of curvature, and the radius of curvature is prepared to a size equal to the radius of curvature of the uniformly granulated particles of catalyst 44a, or to a size slightly larger (for example, by several percentages) than that of the particles of catalyst 44a. Generally, the applied steam reforming catalyst, oxidation catalyst, shift catalyst, and the like prepared by granulation are the known ones, and the dimple face 45 prepared has concavities having a radius of curvature agreeing with the diameter of prepared catalyst particles.

Figure 12:
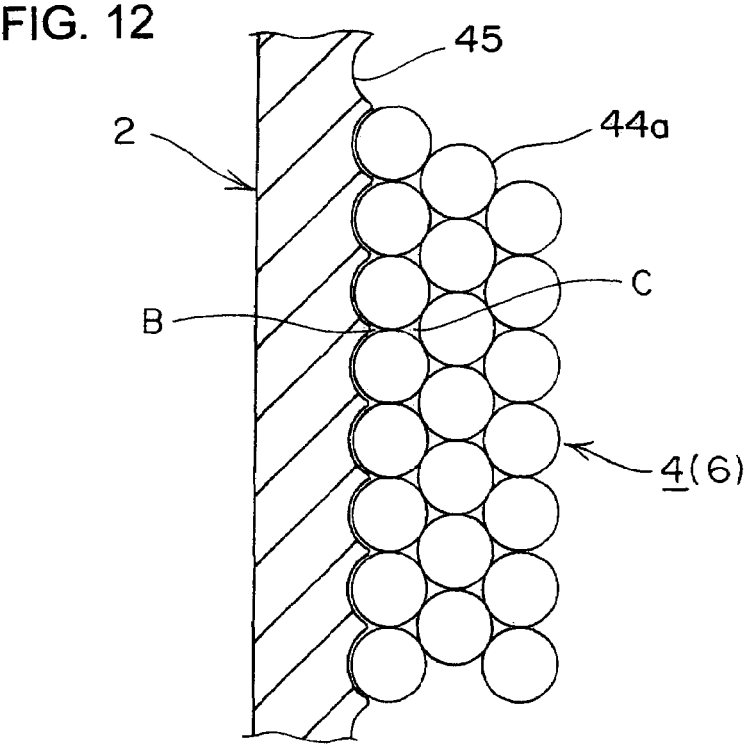
FIG. 12 is a schematic part-enlarged drawing of inner face of the high-temperature reaction section and the adjacent mixed catalyst bed in FIG. 11.

FIG. 12 shows a schematic drawing of enlarged cross sectional view of the contact state between the catalyst particles 44a and the dimple face 45. As described above, since the individual concavities on the dimple face 45 are formed to have a substantially equal radius of curvature to that of the catalyst particles 44a, the individual particles of catalyst 44a contacting with the inner face 2a of the inner cylinder 2 are arranged in a face-contact state to the individual concavities. Consequently, the void B formed between the inner face 2a and the catalyst particles 44a becomes small, thereby bringing the void B substantially equal to the void C formed between the catalyst particles 44a adjacent with each other at second and succeeding rows.

As described above, when the void B and the void C become almost equal in level with each other, the mixed catalyst bed 4 has totally uniform void fraction, which allows the raw material gas-gas-steam mixture to maintain homogeneous flow without generating segregated flow pattern. As a result, the contact time between the raw material gas-gas-steam mixture passing through the mixed catalyst bed 4 and the catalyst becomes uniform, which results in improved reaction efficiency in the high-temperature reaction section 6. Furthermore, since the particles of catalyst 44a can be packed to an ideal closest-packing, further increased number of particles of catalyst 44a can be packed within the same space, which also improves the reaction efficiency.

Once the void B between the particles of catalyst 44a and the inner face 2a decreased, the heat transfer and diffusion to outside through the inner face 2a increases corresponding to the quantity of the decrease in void B. The increase in the heat transfer and diffusion is, however, suppressed by the heat-transfer suppressor 50. Therefore, by the combination of the wall face shape according to the embodiment with the above-described heat transfer and diffusion suppressor 50, the lowering in the thermal efficiency can be effectively suppressed while maintaining the high reaction efficiency.

The above embodiments describe the inner face 2a of the inner cylinder 2, which inner face 2a contacts with the mixed catalyst bed 4. The present invention, however, is not limited to the configuration, and the present invention is similarly applicable also to the inner face of the outer cylinder 3 contacting with the steam reforming catalyst bed 16, or to the inner face 2a of the inner cylinder 2 contacting with the high-temperature shift catalyst bed 8 and the low-temperature shift catalyst bed 9.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A steam reformer comprising a double-cylinder structure having an inner cylinder and an outer cylinder surrounding the inner cylinder; the inner cylinder containing a high-temperature reaction section and an adjacent section being adjacent to the high-temperature reaction section; the high-temperature reaction section containing a mixed-catalyst bed prepared by mixing a steam reforming catalyst and an oxidation catalyst, and having an oxygen-containing gas introduction section; and the outer cylinder containing a steam reforming catalyst bed, thereby forming the steam reformer of double-cylinder structure; wherein a heat transfer suppresser is structured in the steam reformer to suppress heat transfer from the high-temperature reaction section to the adjacent section or to the oxygen-containing gas introduction section, whereby a vacant layer isolating the high-temperature reaction section from the adjacent section at a specific distance is formed, the vacant layer structuring the heat-transfer suppressor to suppress heat transfer between the high-temperature reaction section and the adjacent section, the steam reformer further comprising, within the gas introduction section, an introduction conduit extending along the axis of inner cylinder, and an ejection part proximal the front end of the introduction conduit, introduction conduit having an outward support piece protruding outward from it and a support piece protruding inwardly within the inner cylinder opposite the outward support piece, whereby the bottom of a mixed catalyst bed is supported by an air-permeable support positioned on support pieces, whereby the vacant layer between the support and the adjacent section 7 is formed.

2. The steam reformer as in claim 1, wherein the opening part 30 is formed by a plurality of slits 31 being arranged in annular pattern on the inner wall part 25.

3. A double-cylinder steam reformer comprising:

an inner cylinder (2) and, surrounding the inner cylinder, an outer cylinder (3) the inner cylinder (2) having a high-temperature reaction section (6) and, adjacent thereto, adjacent section (7), the high-temperature reaction section (6) containing a mixed-catalyst bed (4), provided with an oxygen-containing gas introduction section (5), the bed comprising a steam reforming catalyst and an oxidation catalyst, wherein outer cylinder (3) contains a steam reforming catalyst bed (16), thereby forming double-cylinder steam reformer (1), the double-cylinder steam reformer further comprising a heat transfer suppresser (50) formed within the steam reformer (1) to suppress heat transfer between high-temperature reaction section (6) and either or both of adjacent section (7) and oxygen-containing gas introduction section (5), oxygen-containing gas containing section (5) having, an introduction conduit (14) extending along the axis of inner cylinder (2), and an ejection part (15) proximal the front end of introduction conduit (14), introduction conduit (14) having a cylinder body (40a) providing one of a gap layer (41a) external to introduction conduit (14), or a heat-insulation layer (43a) to cover outside of the introduction conduit (14), wherein cylinder body (40a) or the heat-insulation layer (43a) causes heat-transfer suppressor (50) to suppress the heat transfer from the high-temperature reaction section (6) to the oxygen-containing gas introduction section (4).

4. A steam reformer comprising:

a double-cylinder structure having an inner cylinder (2) and an outer cylinder (3) surrounding the inner cylinder (2); the inner cylinder (2) containing a high-temperature reaction section (6) and an adjacent section (7) being adjacent to the high-temperature reaction section (6);

the high-temperature reaction section (6) containing a mixed-catalyst bed (4) prepared by mixing a steam reforming catalyst and an oxidation catalyst, and having an oxygen-containing gas introduction section (5); and the outer cylinder (3) containing a steam reforming catalyst bed (16), thereby forming the steam reformer (1) of double-cylinder structure; wherein a heat transfer suppresser (50) is structured in the steam reformer (1) to suppress heat transfer from the high-temperature reaction section (6) to the adjacent section (7) or to the oxygen-containing gas introduction section (5), and further comprising a heat-insulation section (24) having a hollow portion disposed between a portion of inner cylinder (2), which includes high-temperature reaction section (6), and a portion of outer cylinder (3) that faces the portion of inner cylinder 2, to define opening part (30) opening into an inner wall part (25), thereby enabling heat-transfer suppressor (50) to suppress heat transfer from the high-temperature reaction section (6) to the adjacent section (7).

5. The steam reformer of either of claims 1 or 4, wherein a heat-insulation section having a hollow part therein is placed between a portion of the inner cylinder containing the high-temperature reaction section and a portion of the outer cylinder facing the portion of inner cylinder to form an opening part being opened in an inner wall part structuring the hollow part, thus the opening part structures the heat-transfer suppressor to suppress heat transfer from the high-temperature reaction section to the adjacent section, further a vacant layer is formed to isolate the high-temperature reaction section from the adjacent section at a specific distance, thus the vacant layer structures the heat-transfer suppressor to suppress heat transfer from the high-temperature reaction section 6 to the adjacent section.

6. The steam reformer of either of claims 1, 3 or 4 wherein the inner cylinder contains, adding to the mixed catalyst bed, a high-temperature shift catalyst bed and a low-temperature shift catalyst bed; the outer cylinder contains a steam reforming catalyst bed; each of the high-temperature shift catalyst bed, the low-temperature shift catalyst bed, and the steam reforming catalyst bed is packed with a catalyst in particle shape; and inner wall face of at least one of the mixed catalyst bed, the high-temperature shift catalyst bed, the low-temperature shift catalyst bed, and the steam reforming catalyst bed, which beds contacting with the catalyst particles, is formed to a dimple face where many concavities are successively arranged uniformly in two-dimensional morphology, thereby establishing the face-contact between the catalyst particles and the concavities.

7. The steam reformer of claim 3 further comprising, in addition to the cylinder body and or the heat-insulation layer 41, (1) a heat-insulation section having a hollow part therein being placed between a portion of the inner cylinder containing the high-temperature reaction section 6 and a portion of the outer cylinder facing the portion of inner cylinder to form an opening part being opened in an inner wall part structuring the hollow part, thereby structuring the heat-transfer suppressor by the opening part to suppress heat transfer from the high-temperature reaction section to the adjacent section;

(2) a vacant layer being formed to isolate the high-temperature reaction section from the adjacent section at a specific distance, thereby structuring the heat-transfer suppressor by the vacant layer to suppress heat transfer from the high-temperature reaction section to the adjacent section; or (3) the heat-transfer suppressors for both above and said vacant layer.

* * * * *